United States Patent [19]

Kawaguchi

[11] 4,456,099

[45] Jun. 26, 1984

[54] DISK BRAKE APPARATUS WITH COOLING FINS

[75] Inventor: Takeshi Kawaguchi, Fujimi, Japan

[73] Assignee: Honda Giken Kogyo Kabushiki Kaisha, Tokyo, Japan

[21] Appl. No.: 236,496

[22] Filed: Sep. 1, 1981

[30] Foreign Application Priority Data

Feb. 22, 1980 [JP] Japan .............................. 55-21076[U]
Feb. 22, 1980 [JP] Japan .............................. 55-21077[U]
Feb. 22, 1980 [JP] Japan .............................. 55-21078[U]
Feb. 22, 1980 [JP] Japan .............................. 55-21079[U]
Mar. 10, 1980 [JP] Japan .............................. 55-29857[U]

[51] Int. Cl.³ .................... F16D 65/847; F16D 65/12
[52] U.S. Cl. ................................ 188/71.6; 188/18 A; 188/72.5; 188/73.32; 188/218 A; 188/264 A; 188/264 W
[58] Field of Search .......... 188/71.6, 264 A, 264 AA, 188/264 P, 264 W, 218 R, 218 A, 218 XL, 18 A, 18 R, 22, 24.11, 24.16, 71.3, 71.4, 344, 71.5, 368, 72.5, 370, 72.4, 369, 73.32–73.34, 73.44, 73.45; 192/113 A; 301/6 CS, 6 WB

[56] References Cited

U.S. PATENT DOCUMENTS

| | | | |
|---|---|---|---|
| 2,304,368 | 12/1942 | Milan | 188/264 AA X |
| 2,331,259 | 10/1943 | Whitten | 188/264 AA X |
| 2,888,102 | 5/1959 | Eksergian et al. | 188/71.6 |
| 2,976,083 | 3/1961 | Zink et al. | 188/264 W |
| 3,059,730 | 10/1962 | Nickell et al. | 188/71.6 |
| 4,005,768 | 2/1977 | Bubnash et al. | 188/218 A |
| 4,062,427 | 12/1977 | Klaue | 188/71.6 X |
| 4,102,443 | 7/1978 | Kohler et al. | 188/218 XL |
| 4,155,432 | 5/1979 | Krause | 188/218 XL |
| 4,222,464 | 9/1980 | Moriya et al. | 188/73.44 |
| 4,232,763 | 11/1980 | Klaue | 188/264 AA X |

FOREIGN PATENT DOCUMENTS

| | | | |
|---|---|---|---|
| 54-129259 | 10/1979 | Japan | 188/71.6 |
| 1067057 | 4/1967 | United Kingdom | |
| 2072280 | 9/1981 | United Kingdom | 188/71.6 |

*Primary Examiner*—Douglas C. Butler
*Attorney, Agent, or Firm*—Armstrong, Nikaido, Marmelstein & Kubovcik

[57] ABSTRACT

A disk brake for a motor vehicle includes a brake disk carried by a wheel hub and which has radial fins, the fins dissipating heat and inducing a flow of air over the brake disk. A cover closes the side of the brake disk remote from the wheel hub and supports a caliper brake mechanism, an arcuate segment of the fins being removable to permit replacement of brake pads of the brake mechanism.

10 Claims, 7 Drawing Figures

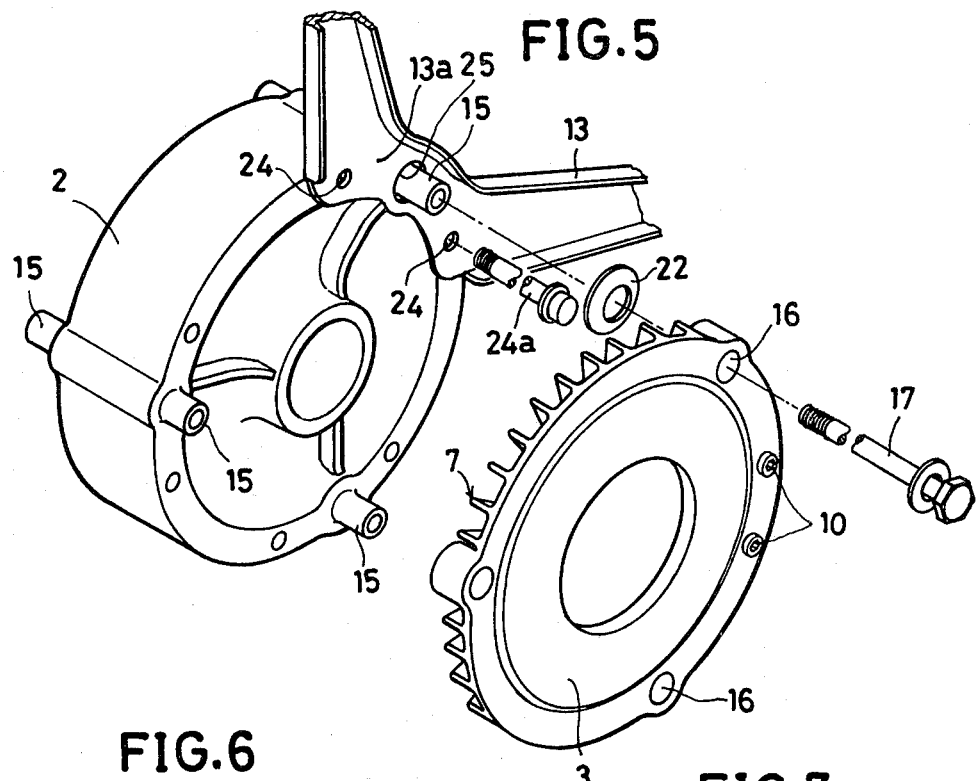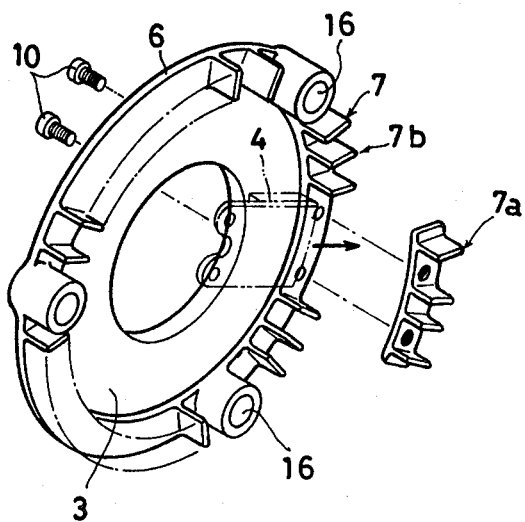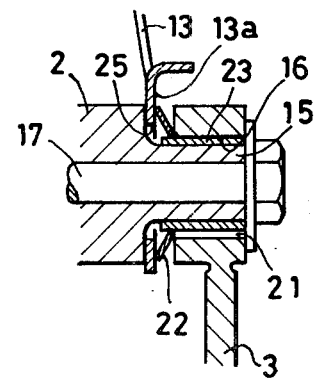

DISK BRAKE APPARATUS WITH COOLING FINS

FIELD OF THE INVENTION

This invention relates to a disk brake for a motor vehicle, and while not limited thereto, relates more particularly to a disk brake for a motorcycle of the type including an annular brake disk carried by a wheel hub, and a caliper brake mechanism associated therewith and which extends through the central opening of the brake disk, the brake mechanism having brake pads which are engaged with opposite radial faces of the brake disk upon the application of force to the brake pads by a hydraulic piston and cylinder arrangement of the brake mechanism.

BACKGROUND OF THE INVENTION

In prior disk brakes of the type referred to, there is a tendency for the brake disk to overheat upon the application of a braking force thereto, with the consequential disadvantages of loss or fading of braking power, and, buckling of the brake disk under the influence of the stresses thermally induced therein. In order to assist in the rapid dissipation of heat from the brake disk, it has heretofore been considered necessary to construct the disk brake in such a manner that the brake disk is exposed to air flow past the motor vehicle. Such a construction, however, carries with it the disadvantage that the brake disk is exposed to the elements and is subjected to fouling by water, mud, oil slick or the like, which again can seriously affect the braking capability of the brake, and further results in rapid attrition of the brake pads and scoring of the brake disk.

OBJECT OF THE INVENTION

It is an object of this invention to mitigate or eliminate the disadvantages of the prior known disk brake construction, by enhancing the dissipation of heat from the brake disk, and by employing the brake disk itself as an impeller for increasing the flow of cooling air across the radial face of the disk. Additionally, it is an object of this invention to protect the faces of the brake disk and the brake pads from the elements, thus increasing the useful life thereof.

INVENTIVE CONCEPT

According to the present invention, the brake disk is provided at a location radially outwardly of the brake pads with radially extending fins which serve in the dual capacity of dissipating heat produced in the brake disk, and in the capacity of inducing a flow of cooling air radially across the face of the brake disk. The fins may be formed either integrally with the brake disk or attached thereto in any convenient manner, and preferably, an arcuate segment of the fins is removable from the brake disk in order to permit ready removable of the brake pads in a direction radialy of the brake disk face for replacement of the brake pads.

Additionally, the brake disk is enclosed by a stationary cover which protects the brake disk from fouling with water, oil slick or the like, the cover having one or more air inlet openings, which preferably comprise an air scoop in order further to enhance the flow of cooling air across the face of the brake disk, and, further enhance the dissipation of heat from the brake disk by the radially extending fins associated therewith.

DESCRIPTION OF THE DRAWINGS

The invention will now be described with reference to the accompanying drawings, which are illustrative of one preferred embodiment of the invention, and in which:

FIG. 5 is an exploded fragmentary view showing a brake disk of the present invention in association with a wheel hub of the motorcycle;

FIG. 6 is an exploded perspective view showing the reverse face of the brake disk of FIG. 7; and FIG. 7 is a fragmentary sectional view through a brake disk supporting boss of the wheel hub in association with the brake disk.

DESCRIPTION OF THE PREFERRED EMBODIMENT

Figure 1:
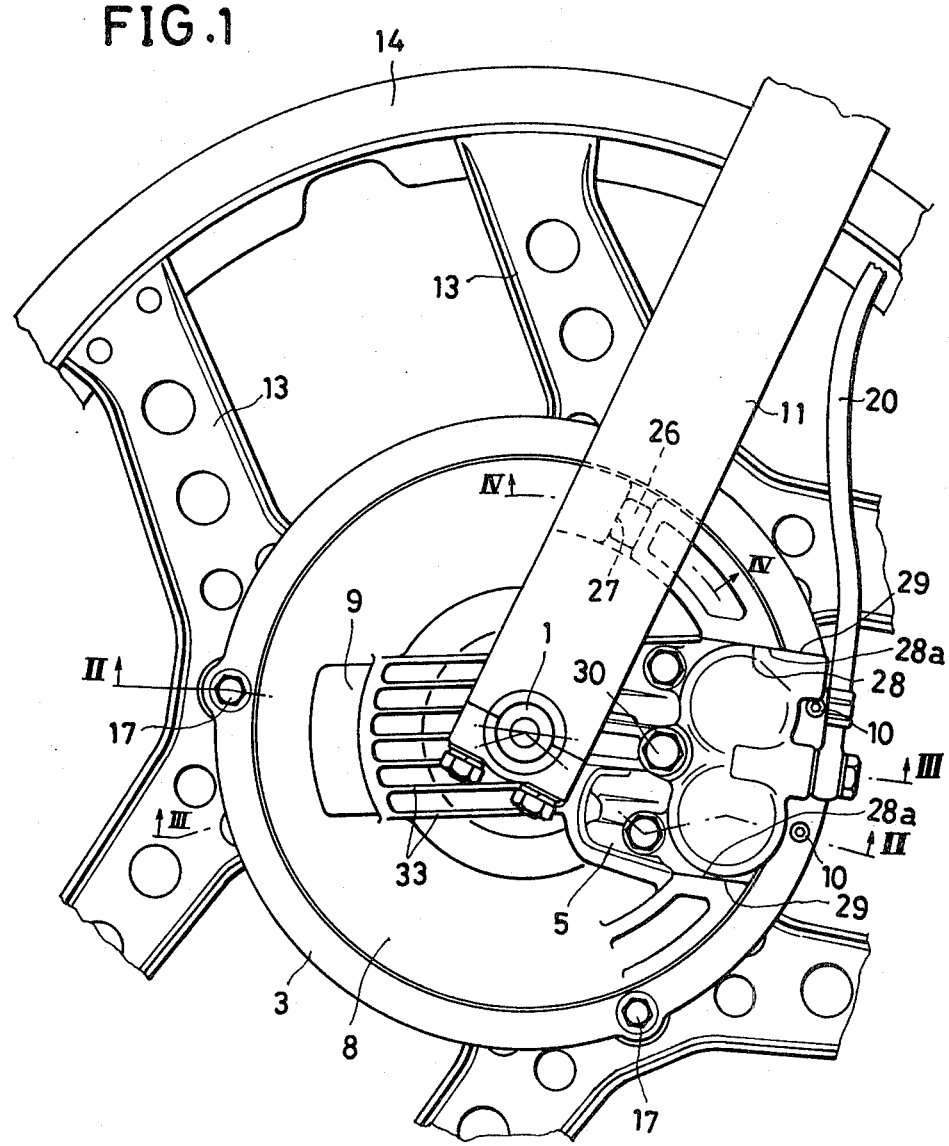
FIG. 1 is a fragmentary side elevation of a disk brake according to the present invention in the environment of a front wheel of a motorcycle.

Referring now to the drawings, there is illustrated a front wheel assembly for a motorcycle, the front wheel including a wheel hub 2 which is supported by bearings 12 for rotation on a wheel axle 1 carried by steering forks 11 of the motorcycle.

The wheel hub 2 has plate-shaped spokes 13 attached thereto, the spokes 13 supporting a wheel rim 14.

Carried by the wheel hub 2 is at least one brake disk 3 (two are shown), the brake disk having bosses at the outer periphery thereof having apertures 16, within each of which is received a boss 15 integral with the wheel hub 2, the brake disk 3 being secured to the wheel hub 2 in floating relationship therewith by means of bolts 17. As is more clearly illustrated in FIG. 7, the apertures 16 are of a dimension greater than that of the bosses 15 in order to allow expansion and contraction of the brake disk 3 relatively to the wheel hub 2, the respective bosses 15 having a collar 23 of a wear resistant material, such as steel, extending axially thereof in order to protect the bosses 15 from wear.

Interposed between the wheel hub 2 and the brake disk 3 are spring washers 22, such as Belleville washers, which react respectively against the brake disk 3 and against the plate-shaped spokes 13 of the wheel.

The plate-shaped spokes 13 are secured to the wheel hub 2 by means of bolts 24a which are received in threaded bores in the wheel hub 2, and which extend through apertures 24 in a radially inner portion 13a of the plate-shape spokes 13. The radially inner portion of the plate-shaped spokes 13 also includes an aperture 25 through which a boss 15 of the wheel hub freely extends.

A brake disk 3 is carried by the wheel hub 2 on both of the radial end faces of the wheel hub 2, the respective brake disks 3 being identical with each other and each having a radially extending flange 6 at the outer periphery thereof, the radially extending flange 6 incorporating radially and axially extending fins 7 which extend towards the wheel hub 2.

In order to allow for the ready replacement of brake pads hereinafter referred to, an arcuate segment 7a of the fins is formed as an unitary sub-assembly, the arcuate segment 7a being detachably secured to the brake disk 3 by bolts 10 for the fins 7a to form a continuation of the fins 7b formed integrally with the brake disk 3.

A disk shaped cover 8 encloses each brake disk 3, the cover 8 including at least one inlet aperture 9, which preferably is in the form of an air scoop facing into the direction of motion of the motorcycle when driven. The cover 8 also includes an aperture in the form of a radially extending groove 28 having upper and lower edges 28a. Received within the groove is a caliper brake mechanism 5, the caliper brake mechanism including brake pads 4 carried by supports 4a. The respective caliper brake mechanisms each include a piston 18 slidable within a hydraulic cylinder of the caliper mechanism and which reacts on the brake pad supports 4a in order to force the brake pads 4 into frictional engagement with the respective brake disks 3.

Figure 4:
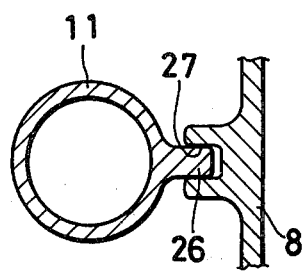
FIG. 4 is a fragmentary sectional view taken through one of the steering forks of the motorcycle.

The respective caliper brake mechanisms 5 are supported on the cover members 8 by means of a single bolt-shaped pin 30 which is fast with the associated caliper brake mechanism 5, and which extends through a bore 31 in a boss formed integrally with the cover 8. The respective caliper brake mechanisms 5 are thus supported for sliding movement in a direction parallel to the axis of rotation of the wheel hub and are free to float in that direction. As is illustrated more clearly in FIG. 4, the cover 8 of each caliper brake mechanism includes a longitudinal slot 27 in which is received a tongue 26 secured to the respective steering forks 11 or formed integrally therewith. In this way, the cover is relieved from the rotational forces which otherwise would be imposed upon it during a braking operation.

Figure 2:
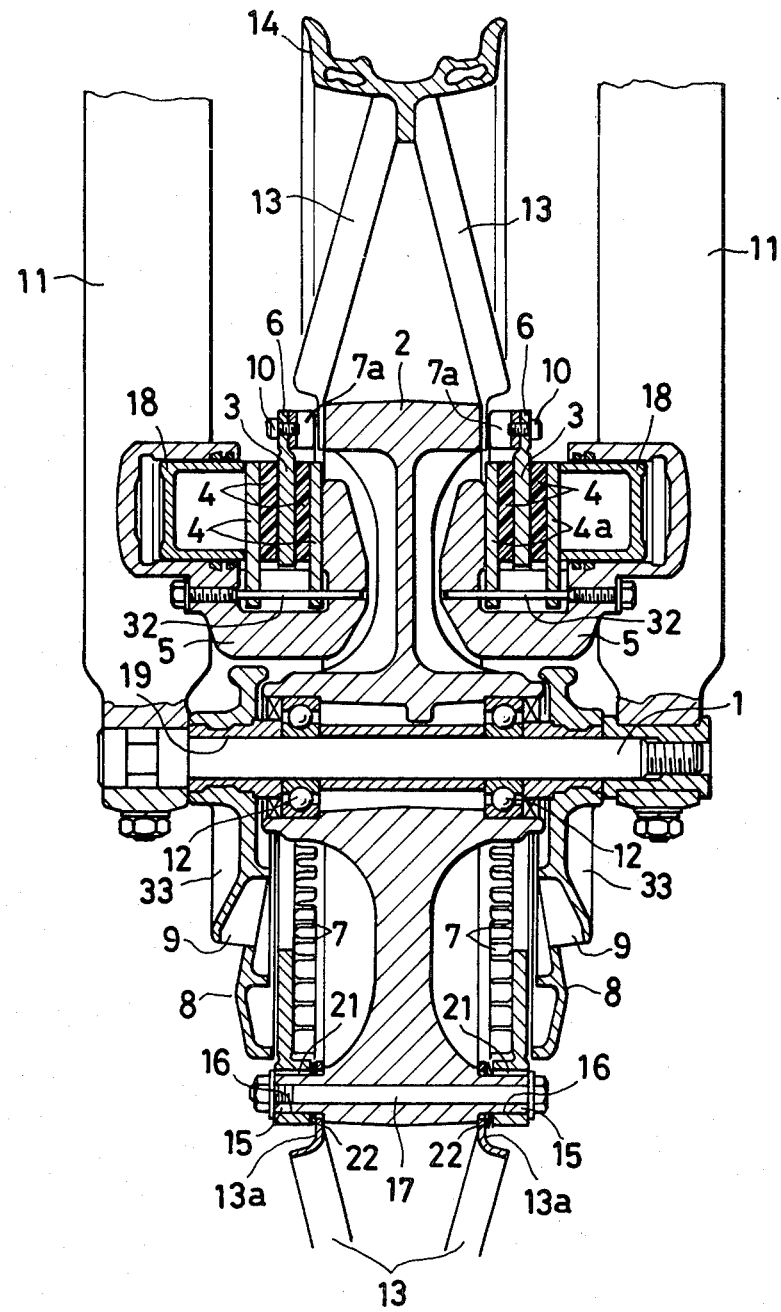
FIG. 2 is a cross section taken along the line II—II of FIG. 1.
Figure 3:
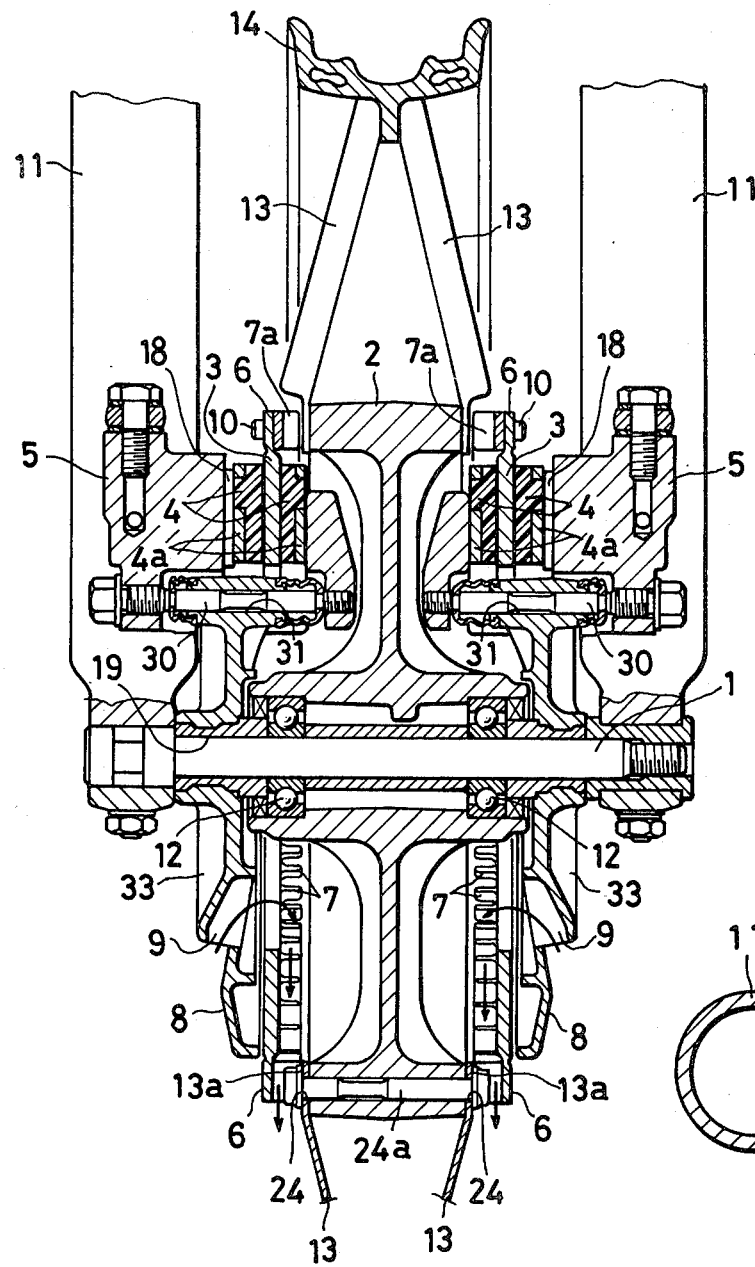
FIG. 3 is a cross section taken along the line III—III of FIG. 1.

As is more clearly illustrated in FIG. 2, the respective brake pad supports 4a are secured in the body of the caliper brake mechanisms 5 by pins 32 which are secured in the body of the caliper brake mechanisms, and which extend through apertures in lugs of the brake pad supports 4a. The brake pad supports 4a are thus free to float relatively to the body of the caliper brake mechanisms 5 in a direction axially of the axis of rotation of the wheel hub, but are restrained against movement in any other direction.

Preferably, the disk-shaped cover 8 is provided with heat dissipating fins 33, the respective disk-shaped covers 8 being supported directly on the wheel axle 1 which extends through apertures 19 in central bosses of the disk shaped covers 8, the respective disk-shaped covers 8 being immovably clamped between the respective steering forks 11 of the motorcycle.

In operation, and during forward progression of the motorcycle, the wheel hub 2 rotates, and in turn rotates the brake disks 3, the radial fins 7 associated with the respective brake disks 3 acting as impellers to draw air across the face of the brake disks, while at the same time acting to enhance the dissipation of heat from the respective brake disks. During the forward progression of the motorcycle, the flow of cooling air across the brake disks is further enhanced by the air scoops 9 which face into the direction of travel, and which act as air rams which collect air and force it through the interior of the cover members, again enhancing the efficiency of the fins 7 in their capacity of impellers and in their capacity of heat dissipating members.

While not providing a complete enclosure for the respective brake disks, the cover members provide the brake disks with a substantial extent of protection against fouling by water, mud, oil slick or the like, and additionally enhance the aesthetic appearance of the brake assembly.

In the event that it should prove necessary to replace the brake pads 4, this readily can be accomplished without disassembling the brake, merely by rotating the wheel to a position in which the arcuate segment 7a is angularly aligned with the brake pads 4, and then removing the arcuate segment 7a. Upon withdrawal of the support pins 32, the respective brake pad supports 4a can then be withdrawn radially outwardly of the brake disks 3 for replacement, the axially inner brake pad supports 4a passing through the arcuate interruption in the fins 7b produced by removal of the arcuate segment 7a.

While a preferred embodiment of the invention has been described in this application, it will be appreciated that modifications of the structures disclosed may be made without departing from the scope of the invention as defined in the appended claims.

What is claimed is:

1. In a disk brake for a motor vehicle of the type including an annular brake disk carried by a wheel hub, the hub being rotatably mounted on an axle, and a caliper brake mechanism carried by a stationary support and extended through a central opening of the brake disk, the brake mechanism having brake pads engaging with opposite radial faces of the brake disk upon application of force thereto by a piston and cylinder arrangement, the improvement wherein:

said stationary support comprises a cover member directly supported on the axle and secured so as not to rotate, said cover member having a front portion with an air introducing opening therein and a rear portion with a brake mechanism receiving opening therein, the cover member enclosing that face of the brake disk which faces outwardly of the wheel hub, the brake mechanism receiving opening having side edges, the brake mechanism being mounted on the cover member in the receiving opening so as to be axially movable but secured from circumferential movement by engagement with said side edges, and fins are provided on the brake disk at a position radially outwardly of the brake pads and of an outer periphery of said cover member, said fins extending axially and radially of at least one face of the disk and comprise impellers for enhancing flow of air past the disk and for enhancing dissipation of heat from the disk.

2. A disk brake according to claim 1, including an arcuate segment of said fins formed as a unitary subassembly and means detachably attaching said arcuate segment to said disk in continuation with fins formed integrally with said disk to provide a continuous annular array of said fins.

3. A disk brake according to claim 1, in which said fins are positioned on a radial flange of said brake disk at the outer periphery thereof.

4. A disk brake according to claim 1, including two brake disks, each being attached to one axial end of said wheel hub two cover members, and two caliper brake mechanisms each being associated with one said brake disk, each said brake disk including fins located on said brake disk at a location radially outwardly of said brake pads, said fins extending axially and radially of at least one face of each brake disk.

5. A disk brake according to claim 1 or claim 4, including at least one boss extending axially outwardly from a side face of said wheel hub and which extends through a complementary opening in the outer periphery of said brake disk.

6. A disk brake according to claim 5, in which said opening is formed in a boss integral with said brake disk and which is located at the outer periphery of said brake disk.

7. A disk brake according to claim 5, including a collar of a wear resistant material extending axially of said boss.

8. A disk brake according to claim 5, in which said boss is dimensioned for it to extend through said opening with clearance from the edges of said opening.

9. A disk brake according to claim 5, including a spring washer surrounding said boss and interposed between said side face of said wheel hu and said brake disk.

10. A disk brake according to claim 1, in which said caliper brake mechanism is supported on the cover member for movement axially of said wheel hub by a pin slidably received within a bore of a boss carried by said cover.

* * * * *